US012106393B1

(12) United States Patent
Ward

(10) Patent No.: US 12,106,393 B1
(45) Date of Patent: Oct. 1, 2024

(54) ARTIFICIAL INTELLIGENCE FOR REDUCING BIAS IN POLICING

(71) Applicant: Authenticating.com, LLC, Santa Monica, CA (US)

(72) Inventor: Steven Brandon Ward, Palm Beach Gardens, FL (US)

(73) Assignee: AUTHENTICATING.COM, LLC, Santa Monica, CA (US)

( * ) Notice: Subject to any disclaimer, the term of this patent is extended or adjusted under 35 U.S.C. 154(b) by 0 days.

(21) Appl. No.: 18/386,957

(22) Filed: Nov. 3, 2023

Related U.S. Application Data

(60) Provisional application No. 63/531,671, filed on Aug. 9, 2023.

(51) Int. Cl.
*G06Q 10/10* (2023.01)
*G06Q 10/06* (2023.01)
*G06Q 30/02* (2023.01)
*G06Q 30/06* (2023.01)
*G06Q 40/08* (2012.01)
*G06Q 50/26* (2012.01)

(52) U.S. Cl.
CPC .................................. *G06Q 50/265* (2013.01)

(58) Field of Classification Search
CPC .................................................... G06Q 50/265
USPC .................................................. 705/1.1, 325
See application file for complete search history.

(56) References Cited

U.S. PATENT DOCUMENTS

| | | | | |
|---|---|---|---|---|
| 5,012,335 | A * | 4/1991 | Cohodar | G08B 13/19632 396/419 |
| 8,873,719 | B2 | 10/2014 | Clawson | |
| 9,699,401 | B1 * | 7/2017 | Jones | H04N 21/41407 |
| 9,913,121 | B2 | 3/2018 | Johnson et al. | |
| 10,271,032 | B2 | 4/2019 | Waniguchi et al. | |
| 10,789,840 | B2 | 9/2020 | Boykin et al. | |
| 10,990,901 | B2 | 4/2021 | Deo et al. | |
| 11,375,161 | B2 | 6/2022 | Shimada et al. | |
| 11,551,117 | B1 * | 1/2023 | Malhotra | G06Q 50/26 |
| 11,638,124 | B2 | 4/2023 | Bohlander et al. | |
| 2008/0270207 | A1 * | 10/2008 | Santos | G06Q 10/10 705/7.41 |
| 2012/0016678 | A1 | 1/2012 | Gruber et al. | |
| 2017/0272707 | A1 * | 9/2017 | Davis | H04N 23/60 |

(Continued)

FOREIGN PATENT DOCUMENTS

| | | |
|---|---|---|
| CN | 105808200 B | 9/2019 |
| WO | 2022133125 A1 | 6/2022 |

OTHER PUBLICATIONS

Jany, Libor. Aug. 22, 2023. LAPD to use AI to analyze body cam videos for officers language use. 5 pages.

(Continued)

*Primary Examiner* — Jonathan P Ouellette
(74) *Attorney, Agent, or Firm* — POLSINELLI PC

(57) ABSTRACT

Aspects of the disclosure are directed to developing and using collaborative artificial intelligence (AI) systems in policing that are focused on reducing bias and promoting fairness. The collaborative AI systems may be trained using data collected from various sources, including social science research, law enforcement data, and any other publicly available data. The collaborative AI systems may identify patterns and tendencies in human behaviors to generate recommended actions based on ongoing situations.

20 Claims, 9 Drawing Sheets

(56) References Cited

U.S. PATENT DOCUMENTS

| | | | | |
|---|---|---|---|---|
| 2017/0316775 | A1 | 11/2017 | Le et al. | |
| 2018/0350389 | A1 | 12/2018 | Garrido et al. | |
| 2019/0042988 | A1 | 2/2019 | Brown et al. | |
| 2019/0095707 | A1* | 3/2019 | Thompson | G08G 1/012 |
| 2019/0096428 | A1 | 3/2019 | Childress et al. | |
| 2019/0188814 | A1 | 6/2019 | Kreitzer et al. | |
| 2019/0258700 | A1 | 8/2019 | Beaver et al. | |
| 2020/0082300 | A1 | 3/2020 | Farrar et al. | |
| 2021/0056569 | A1 | 2/2021 | Silberman et al. | |
| 2021/0256832 | A1* | 8/2021 | Weisz | G10L 25/51 |
| 2022/0188736 | A1* | 6/2022 | Colbert | G06Q 50/26 |
| 2022/0189501 | A1* | 6/2022 | Shastry | G10L 15/26 |
| 2022/0217308 | A1* | 7/2022 | Mont-Reynaud | H04N 23/611 |
| 2022/0366345 | A1* | 11/2022 | Jones | G06Q 10/06393 |
| 2024/0168544 | A1* | 5/2024 | Stephens | G06F 3/011 |

OTHER PUBLICATIONS

Kenny, Catherine. Apr. 13, 2021. Artificial Inelligence: Can We Trust Machines to Make Fair Decisions? 22 pages.
Hung, Tzu-Wei et al. Jun. 5, 2023. Predictive policin and algorithmic fairness.
Verma, Pranshu. Jul. 15, 2022. The never-ending quest to predict crime using AI. 4 pages.
Reese, Hope. Feb. 23, 2022. What Happens When Police Use AI to Predict and Prevent Crime. 11 pages.
Heaven, Will Douglas. Jul. 17, 2020. Predictive policing algorithms are racist. They need to be dismantled. 32 pages.
Jany, Libor. Jul. 4, 2022. Researchers use AI to predict crime, biased policing in major U.S. cities like L.A.
Thompson, Evan, et al. Dec. 20, 2008. Making Sense of Sense-Making: Reflections on Enactive and Extended Mind Theories. 8 pages.
Doll, Bradley, et al. Apr. 20, 2011. Dopaminergic Genes Predict Individual Differences in Susceptibility to Confirmation Bias. 11 pages.
Kross, Ethan, et al. May 9, 2008. Facilitating Adaptive Emotional Analysis: Distinguishing Distanced-Analysis of Depressive Experienes From Immersed-Analysis and Distraction. 16 pages.
Varela, Francisco, et al. Nov. 13, 1992. The Embodied Mind Cognitive Science and Human Experience. 38 pages.
Thompson, Evan. Dec. 20, 2008. Making Sense of Sense-Making: Reflections on Enactive and Extended Mind Theories. 9 pages.
Buhle, Jason, et al. Nov. 2014. Cognitive Reappraisal of Emotion: A Meta-Analysis fo Human Neuroimaging Studies. 10 pages.
Doll, Bradley, et al. Dec. 2012, The ubiquity of model-based reinforcement learning. 12 pages.
Lutz, Antoine, et al. Sep. 2003. Neurophenomenology Integrating Subjective Experience and Brain Dynamics in the Neuroscience of Consciousness. 22 pages.
Smaldino, Paul. Jun. 2014. The cultural evoluton of emergent group-level traits. 53 pages.
Phan, K. Luan, et al. Nov. 2, 2001. Functional neuroanatomy of Emotion: A Meta-Analysis of Emotion Activation Studies in PET and fMRI 19 pages.
Doll, Bradley, etl al. Nov. 24, 2009. Instructional control of reinforcement learning: A behavioral and neurocomputational investigation. 39 pages.
Perez, Sarah. Sep. 7, 2023. New app Moments helps you maintain your personal and professional relationships. 10 pages.
Hatton, Ian, et al. Feb. 22, 2023 The human cell count and size distribution. 10 pages.
Ferryman, Kadija, et al. Aug. 31, 2023. Considering Biased Data as Informative Artifacts in AI-Assisted Health Care. 6 pages.
Albergotti, Reed. Sep. 13, 2023. Moderna CEO on AI's potential to cure cancer. 11 pages.
Spangler, Todd. Sep. 5, 2023. Story Protocol, Startup Developing Open IP-Collaboration Platform, Raises $54 Million + From Investors Including a16z and Endeavor. 11 pages.
Lopez/Pastor, Victor, et al. Aug. 18, 2023. Self-Learning Machines Based on Hamiltonian Echo Backpropagation. 34 pages.
Czachor, Emily Mai. Aug. 28, 2023. NASA releases first U.S. pollution map images from new instrument launched to space: "Game-changing data". 6 pages.
Dean, James. Aug. 14, 2023. Throwing shade: Model maps NYC street trees' cooling benefits. 3 pages.
Evans, Benedict. Aug. 27, 2023. Generative AI and intellectual property If you put all the world's knowledge into an AI model and use it to make something new, who owns that and who gets paid? this is a completely new probelm that we've been arguing about for 500 years. 7 pages.
Feng, Philip Ph.D. Dec. 12, 2018. Modern Open Source Meassagingin: NATS, RabbitMQ, Apache kafka, hmbdc, Synapse, NSQ and Pulsar. 14 pages.
Hovhannisyn, G., et al. 2023. Individualizing psychological assessment using the five-factor mdoel: A phenomenological, enactivist approach. 1 page.
Snyder, Alison. Aug. 17, 2023. AI is speeding up scientific discoveries and helping to spot new ideas. 8 pages.
Brittain, Blake. Aug. 9, 2023. Meta settles startup's lawsuit over artificial-intelligence trade secrets. 10 pages.
UT Southwestern Medical Center. Aug. 10, 2023. Study identifies characteristics specific to human brains. 7 pages.
Melinek. Aug. 9, 2023. Microsoft partners with Aptos blockchain to marry AI and web3. 7 pages.
Walsh, Bryan. Oct. 26, 2021. Google's Jigsaw introduces VR simulator for police de-escalation. 8 pages.
Leonard, Christopher. Aug. 2, 2023. Lockheed Martin's $1.7 trillion F-35 fighter jet is 10 year slate and 805 over budget—and it could be one of the Pentagon's biggest success stories. 16 pages.
Clark, Max. Jul. 24, 2023. Vitalik Buterin Highlights key Concerns with Worldcoin's Identity Verification System. 7 pages.
Fernandez, Sonia. Jul. 21, 2023. A 'toolbox of bioatalysts' improves control over free radicals. 3 pages.
Borba, Michele. Apr. 16, 2022. A psychologist says these 7 skills separate ucessful kids from 'the ones who struggle'—and how parents can teach them. 6 pages.
Denworth, Lydia. Jul. 1, 2023. Brain Waves Synchronize when People Interact. 14 pages.
Wiggers, Kyle. Jul. 5, 2023. OpenAI is forming a new team to bring superintelligent AI under control. 7 pages.
International Search Report including Written Opinion for Application No. PCT/US2021/063873 mailed Mar. 10, 2022, pp. 1-14.

* cited by examiner

ARTIFICIAL INTELLIGENCE FOR REDUCING BIAS IN POLICING

CROSS-REFERENCE TO RELATED APPLICATIONS

This application claims the benefit of the filing date of U.S. Provisional Patent Application No. 63/531,671 filed Aug. 9, 2023, the disclosure of which is hereby incorporated herein by reference.

BACKGROUND

Bias-based profiling relates to the use of an individual's race, ethnicity, national origin, sex, economic status, age, disability, affiliation(s), or other perceived or actual characteristics of an individual as the basis for law enforcement action. Humans tend to be influenced by their biases, and it is difficult for human brains to process information without influence from these biases.

According to social identity theory, humans prefer those they perceive as having the same characteristics as themselves over others having different characteristics. Social identity theory proposes that people derive a sense of self-esteem and self-worth from their membership in social groups, and that they tend to favor and show greater loyalty to those they perceive as being part of their own "in-group." This often leads to discrimination and prejudice towards "out-groups" including people who are perceived as being different than those in the in some way. Moreover, according to confirmation bias theory, human brains tend to look for information that supports one's preconceptions or confirms one's existing belief and ideas. According to cognitive bias theory, human brains are biologically designed to streamline neurological processing to make sense of the world. Thus, the human brain tends to rely on preconceived opinions, which results in biased neurological processing. Such theories, though complex, make clear that human brains interpret information in view of past experiences and preconceptions, which makes it difficult to eliminate bias-based profiling from law enforcement as it would require training law enforcement officers to think and act in a way that goes against their human nature.

BRIEF SUMMARY

Aspects of the disclosure are directed to developing and using collaborative artificial intelligence (AI) systems in policing that are focused on reducing bias. The computing devices of the collaborative AI systems may train AI models with data collected from various sources, such as studies, research, papers, etc., from fields such as computer science, neuroscience, psychology, sociology, anthropology, philosophy, psychiatry, law enforcement. The AI models may be trained with data input by law enforcement and ethical experts, as well as data corresponding to past policing events. The AI models may be further trained to identify patterns and tendencies in human behaviors to predict human behaviors in a variety of situations to intervene with one or more actions of police officers. The collaborative AI systems may refine and improve the AI models over time using new and/or updated data to ensure that the actions continue to reduce bias.

An aspect of the disclosure provides a system for reducing bias in policing. The system includes one or more processors and memory storing instructions that, when executed by the one or more processors, cause the one or more processors to perform the instructions. The instructions comprise: receiving, from one or more sensors, input data; processing the input data using a collaborative artificial intelligence (AI) model; receiving, from the collaborative AI model, a recommended action for reducing a risk of biased policing; and transmitting the recommended action to an output device of a law enforcement officer.

Another aspect of the disclosure provides a method for reducing bias in policing. The method comprises receiving, by one or more processors, from one or more sensors, input data; processing, by the one or more processors, the input data using a collaborative artificial intelligence (AI) model; receiving, by the one or more processors, from the collaborative AI model, a recommended action for reducing a risk of biased policing; and transmitting, by the one or more processors, the recommended action to an output device of a law enforcement officer.

Yet another aspect of the disclosure provides a non-transitory computer-readable medium storing instructions executable by one or more processors for performing a method of reducing bias in policing. The method comprises: receiving from one or more sensors, input data; processing the input data using a collaborative artificial intelligence (AI) model; receiving, from the collaborative AI model, a recommended action for reducing a risk of biased policing; and transmitting the recommended action to an output device of a law enforcement officer.

The above and other aspects of the disclosure can include one or more of the following features. In some examples, aspects of the disclosure provide for all of the following features in combination.

In an example, the input data further includes one or more of law enforcement reports comprising criminal records, psychological reports, mental facilities reports, correction facilities reports, or dispatch data.

In yet another example, the input data includes video data and/or audio data, captured using the one or more sensors.

In yet another example, the one or more sensors include temperature sensors, proximity sensors, accelerometers, infra-red-light sensors, smoke, gas or alcohol sensors, microphones, audio recorders, or video recorders.

In yet another example, processing the input data using a collaborative artificial intelligence (AI) model includes generating objective representations of human characteristics of the law enforcement officer.

In yet another example, the recommended action for reducing the risk of biased policing includes obvious cues or instructions transmitted in at least one of audio, video, olfactory, haptic, or text format.

In yet another example, the output device of a law enforcement officer comprises at least one of a headphone, earbud, laptop, smartphone, olfactory device, or smart wearable.

In yet another example, the output device of a law enforcement officer includes at least one of the one or more sensors.

DETAILED DESCRIPTION

Figure 1A:
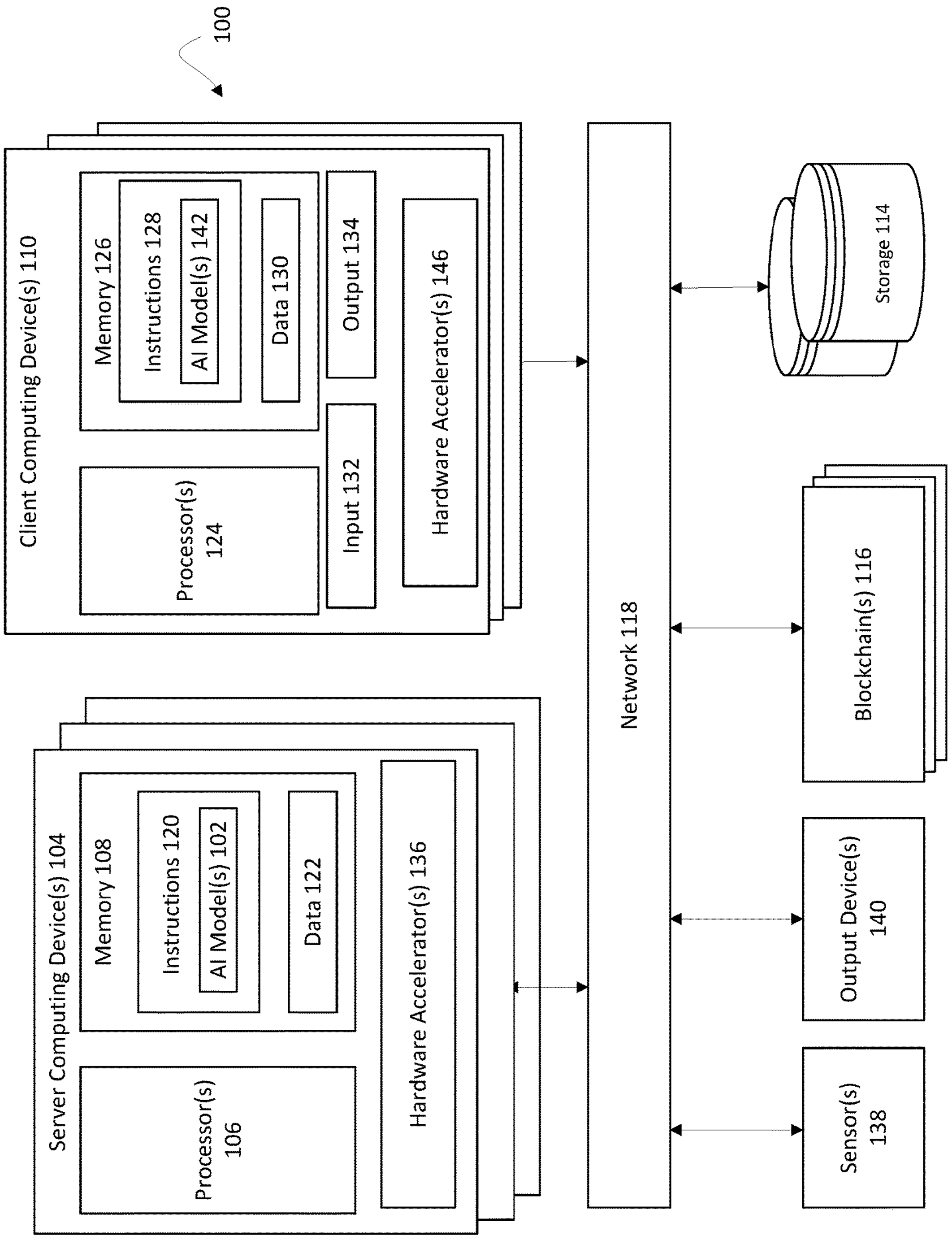
FIG. 1A is a block diagram of an example collaborative AI system according to aspects of the disclosure.

The technology generally relates to collaborative artificial intelligence (AI) systems for reducing bias in policing. By reducing biased behavior by law enforcement officers during interactions, such as policing interactions, suspects and others who interact with law enforcement officers may be treated more equitably. The AI models may be trained to generate cues and/or actionable insights for law enforcement officers during interactions. In this regard, the AI models may output cues or actionable insights to reduce the risk of a biased action being performed by the officer or inform the law enforcement officer of a biased action having been taken. Such cues and actionable insights may be visual, textual, audio, haptic, olfactory, etc.

Law enforcement officers may be trained to follow cues and/or actionable insights provided by the AI models. As such, law enforcement officers can follow the generated actionable insights and/or cues to reduce or avoid the risk of biased actions. For instance, when a law enforcement officer receives a cue and/or actionable insight, the law enforcement officer may take action to reduce the risk of bias or the risk of further bias in response to the received cue. For instance, AI models may output cues or actionable insights when bias or the potential for bias is detected. The actionable insights or cues output by the AI model and provided to the law enforcement officer may make the law enforcement officer aware of the bias or take action to prevent/stop the bias or potential bias before and/or while engaging in interactions with the suspects.

The AI models used by the collaborative AI system may be trained with training data from various scientific fields such as computer science, neuroscience, psychology, sociology, anthropology, philosophy, and/or psychiatry. The training data may, additionally, or alternatively, include formal law enforcement reports, video and/or audio data captured by a law enforcement officer's body camera, or any other sensors attached to the law enforcement officer or law enforcement vehicle, data relating to prior, while or after interactions with criminal suspects or offenders, etc. The video and/or audio data may also include suspect 158's captured voice and behaviors while law enforcement officer 162 is engaging with suspect 158. The training data may also include information received from a dispatcher, local law enforcement department and fire department, hospitals, clinics, shelters, food kitchens, public transit, departments of health, human services, social services, etc. The training data may also include any data obtained from law enforcement officers' training simulations where law enforcement officers may practice responding to imaginary suspects based on the specifics of the situation without relying on bias. The training data may further include any information related to law enforcement officers such as psychiatric evaluation, and questionnaires that can be received from various authorities, which may be analyzed to identify characteristics, tendencies, or preferences of the law enforcement officer. The AI model may be trained using the training data to identify similarities, patterns, tendencies, and/or regularities in human behaviors which may indicate the presence of bias.

The AI models may be trained to analyze interactions between law enforcement officers and suspects to identify the social identities, behavioral patterns, and/or characteristics of the law enforcement officers, other first responders, scene, and/or suspects.

The collaborative AI systems may be used by law enforcement officers during policing interactions. In this regard, the collaborative AI system may assist law enforcement officers in reducing bias during interactions between law enforcement officers and suspects, offenders, bystanders, witnesses, victims, etc. Although the collaborative AI systems are described herein as being used by law enforcement officers, other first responders, such as social workers, negotiators, etc., may also use some or all aspects of the disclosure as described herein. For instance, paramedics and/or firefighters arriving at a scene such as a fire may use the collaborative AI system to reduce bias when interacting with possible victims of the fire.

The collaborative AI systems may use sensors to continually observe interactions between the law enforcement officers and suspects to ensure that biased behavior by the law enforcement officers is reduced or eliminated throughout the duration of interactions. In this regard, the collaborative AI systems may use the AI models to respond to behaviors, including irrational and unpredictable behaviors, of the law enforcement officers, suspects, and others at the scene in real-time by continually processing new data as it is received.

The collaborative AI systems and the AI models may be continuously and repeatedly audited by experts to ascertain that the outcome generated by the AI models is unbiased, not oversimplifying or stereotyping the law enforcement officers or suspects. The experts may include experts in various scientific fields such as psychologist, sociologist, historians, computer scientist, doctors, lawyers, scientists, etc. Auditing may include supervising the training of the AI model or providing feedback to the model based on cues and actionable insights generated by the AI models during inference. Such feedback may include information related to whether the cues and/or actionable insights generated by the AI models during training or inference were correct, partially correct, incorrect, etc. In this regard, the feedback received from the experts may be used as re-training data for the AI models.

The computing devices of the collaborative AI systems may iterate the retraining process for the AI models until reaching an optimal stopping point. The optimal stopping point may be determined using objective representations, to maximize an expected level of unbiasedness and minimize an expected cost using objective representations and dynamic programming.

FIG. 1A depicts a block diagram of an example collaborative AI system 100. The collaborative AI system illustrated in FIG. 1A includes server computing device(s) 104 and client computing device(s) 110, collectively referred to herein as "computing devices."

As shown in FIG. 1A, server computing device 104 includes one or more processors 106, memory 108, and hardware accelerators 136. The processors 106 can include one or more central processing units (CPUs), graphic processing units (GPUs), field-programmable gate arrays (FPGAs), and/or application-specific integrated circuits (ASICs).

The memory 108 can be a type of transitory or non-transitory computer readable medium capable of storing information accessible by the processors 106, such as volatile and non-volatile memory. The memory 108 can store information accessible by the processors 106, including instructions 120 and data 122.

The instructions 120 can include one or more instructions that, when executed by the processors 106, cause the one or more processors to perform actions defined by the instructions 120. The instructions 120 can be stored in object code format for direct processing by the processors 106, or in other formats including interpretable scripts or collections of independent source code modules that are interpreted on demand or compiled in advance.

As further illustrated in FIG. 1A. the instructions 120 include one or more AI models 102, described herein. The AI models 102 can be executed using the processors 106, and/or using other processors remotely located from the server computing device 104.

The data 122 can be retrieved, stored, or modified by the processors 106 in accordance with the instructions 120. The data 122 can be stored in computer registers, in a relational or non-relational database as a table having a plurality of different fields and records, or as JSON, YAML, proto, or XML documents. The data 122 can also be formatted in a computer-readable format such as, but not limited to, binary values, ASCII, or Unicode. Moreover, the data 122 can include information sufficient to identify relevant information, such as numbers, descriptive text, proprietary codes, pointers, references to data stored in other memories, including other network locations, or information that is used by a function to calculate relevant data. Data 122 may further include training data to training AI models such as formal law enforcement reports, video and/or audio data captured by a law enforcement officer's body camera, data relating to prior interactions with criminal suspects or offenders, etc. Data 122 may also include real-time data captured using a variety of sensors attached to law enforcement bodies, law enforcement vehicles, or any other surveillance systems available at the time of the interactions between law enforcement officers and suspects. Data 122 may further include data sent by a dispatcher or any historical data about the law enforcement officer and/or suspects. Data 122 may also include metadata such as location data (e.g. latitude and/or longitude) time data, sensor device data (e.g. make or model information), etc, corresponding to when, where or how the data 122 was captured by sensor(s) 138.

The one or more hardware accelerators 136 can be any type of processor, such as a CPU, GPU, FPGA, or ASIC. The server computing device 104 may also include hardware accelerator 136 on which the AI models 102 may execute for generating actionable insights and/or cues.

The client computing device 110 can be configured similarly to the server computing device 104, with one or more processors 124, memory 126, instructions 128, and data 130.

Instructions 128 may include AI models 142, which may be compared to AI models 102. The server computing device 104 and client computing device 110 can maintain a variety of AI models. For example, the server computing device 104 can maintain different families for deploying AI models on various types of processors/hardware accelerators for efficient processing. Data 130 may include the same or different data as data 122.

The client computing device 110 can also include a user input 132 and a user output 134. The user input 132 can include any mechanism for receiving input from a user, such as a keyboard, mouse, mechanical actuators, soft actuators, touchscreens, microphones, and sensors. The user output 134 can include one or more speakers, transducers or other audio outputs, haptic interfaces, or other tactile feedback devices that provide non-visual and non-audible information to the user of the client computing device 110, displays, and/or scent diffusers. In some instances, the user output 134 may output actionable insights and/or cues, such as actionable insights or cues generated by AI models 136 and/or 146.

Although FIG. 1A illustrates the processors 106, 124, hardware accelerators 136, 146, and the memory 108, 126 as being within the same respective server and client computing devices 104, 110, such components may be distributed across multiple servers and/or client devices. Accordingly, references to such components will be understood to cover possible implementations where a collection of components and/computing devices may or may not operate in parallel.

Although a single server computing device 104 and client computing device 110 are depicted in FIG. 1A, the collaborative AI system 100 can include a variety of different configurations and quantities of computing devices. In some examples, more than one server computing device 104 and client computing device 110 may be communicable with one another via a distributed network. Although each component of server computing device 104 and client computing device 110 is illustrated to be included within the box of server computing device 104 and client computing device 110, respectively, each component may be located within different housings of computing devices. Each component, although separately located, may communicate with one another via a network.

The components of the collaborative AI system 100, including server computing devices 104, client computing devices 110, sensors 138, output devices 140, and storage devices 114 may be capable of direct and indirect communication over network 118. In this regard, each component may be considered a node on the network, with each node capable of communication with another node via the network 118.

The network 118 and intervening nodes described herein can be interconnected using various protocols and systems, such that the network can be part of the Internet, World Wide Web, specific intranets, wide area networks, or local networks. The network 118 can utilize standard communications protocols, such as WiFi, Bluetooth, 4G, 5G, etc., that are proprietary to one or more companies. Although certain advantages are obtained when information is transmitted or received as noted above, other aspects of the subject matter described herein are not limited to any particular manner of transmission. In some instances, protocols may include messaging platforms such as NATs and/or MQTT.

In an example, the client computing devices 110 can connect to a service of the server computing devices 104 through an Internet protocol. The server and client computing devices 104, 110 can set up listening sockets that may accept an initiating connection for sending and receiving information over network 118.

The server computing device 104 and the client computing device 110 can also be connected over the network 118 to the one or more blockchains 116, which can store transactions representing actionable insights generated by the AI models 102, 142. The blockchains 116 can include a distributed database and/or ledger shared among the devices of the collaborative AI system 100 for recording the actionable insights. The blockchains 116 can be public blockchains where the transactions may be read, written, and/or audited by any user who joins and participates in the transactions over the network 118.

As further shown in FIG. 1A, sensors 138, output devices 140, and storage media 114 may be communicable with server computing device 104 and client computing device 142 via network 118.

The storage media 114 can be a combination of volatile and non-volatile memory and can be at the same or different physical locations than the server and client computing devices 104, 110. The storage media 114 may store the input data captured by sensor(s) 138. The storage media 114 may store data 122 stored in memory 108 of server computing device 104 and/or data 130 stored in memory 126 of client computing device 110. The storage media 114 may also store AI models 102 stored in memory 108 and AI models 142 stored in memory 126. For example, the storage devices 114 can include any type of transitory or non-transitory computer-readable medium capable of storing information, such as a hard-drive, solid state drive, tape drive, optical storage, memory card, ROM, RAM, DVD, CD-ROM, write-capable, and read-only memories. Client computing device 110 and/or server computing devices Sensors 138 may include temperature sensors, proximity sensors, accelerometers, infra-red-light sensors, smoke, gas or alcohol sensors, microphones, audio capture devices, video sensors, still image sensors, lidar sensors, thermal image sensors, surveillance cameras, etc. Sensors 138 may capture data during, before, and/or after policing interactions, such as when a law enforcement officer is interacting with a suspect.

Output devices 140 may output actionable insights and/or cues to law enforcement offers. In this regard, output devices may include TV monitors, smartphones, smartwatches, earbuds, headphones, tablets, personal computers, speakers, smart glasses, haptic devices, scent diffusers, etc. Although the output devices 140 and sensors are shown as being separate from the client computing device 110, in some instances, output devices 140 and/or sensors 138 may be incorporated into the client computing device 110 as part of the output 134 and input 132, respectively. For instance, the microphone of a smartphone may function as a sensor 138. The display and/or speakers of the smartphone may operate as the output device 140.

In operation, the server computing device 104 may receive requests to monitor a policing interaction. Such request may be provided upon a law enforcement officer being dispatched to a scene by a dispatcher, the law enforcement officer turning on a computing device and/or sensor, the law enforcement officer or other sending a request via a client computing device, such as client computing device 110, to the server computing device, etc. After receiving the request to monitor a policing interaction, the server computing device 104 may receive input data (described herein) and provide the input data to the AI model 102. The AI models 102 can receive the input data, and in response, generate output data including actionable insights and/or cues. Such actionable insights and/or cues can be output to the requesting device (e.g., client device).

Figure 1B:
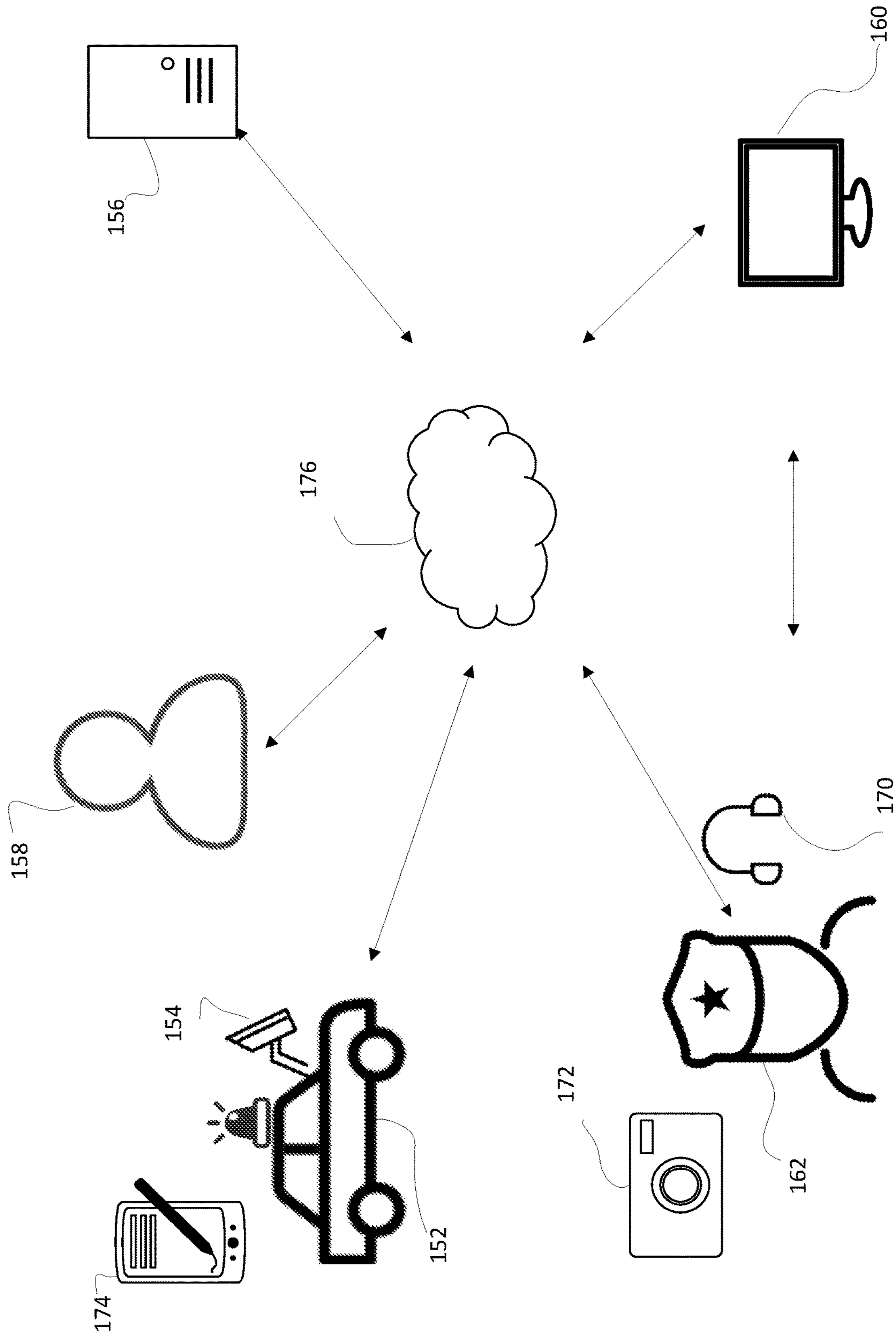
FIG. 1B is an illustration of a scenario in which a law enforcement officer conducts a traffic stop for a suspicious traffic violation using the collaborative AI system according to aspects of the disclosure.

FIG. 1B depicts a diagram illustrating an example use case scenario at a scene where a law enforcement officer conducts a policing interaction (e.g., traffic stop) for a traffic violation using a collaborative AI system, such as collaborative AI system 100. In this example, law enforcement officer 162 pulls over suspect 158. In this example, a sensing device 154 is connected to a law enforcement vehicle 152 and law enforcement officer 162 is wearing a camera 172. The sensing device 154 and camera 172 may correspond to sensors 138 as depicted in FIG. 1A. Although only two sensors, sensing device 154 and camera 172, are shown in FIG. 1B, there may be any number of sensors that can be connected to any number of law enforcement vehicles and/or law enforcement officers. Moreover, although law enforcement officer 162 is shown as wearing a camera and law enforcement vehicle 152 is shown as having a sensing device 154, the law enforcement officer and/or law enforcement vehicle may wear or otherwise include different sensors, or additional sensors.

Sensing device 154 may collect data related to law enforcement officer 162 and suspect 158. Sensing device 154 may correspond to sensors 138 as depicted in FIG. 1A. Sensing device 154 may additionally, or alternatively, capture data corresponding to the scene, such as imagery of objects in the vicinity of the vehicle. Camera 172 may also collect data related to law enforcement officer 162 and suspect 158, as well as imagery of the scene.

Sensing device 154 and camera 172 may send data captured during the policing interaction to computing device 156. In some instances, sensing device 154 and camera 172 may send data captured before and/or after the policing interaction. Sensing device 154 may also capture data associated with images, videos, sound, temperature, and/or scents. In some examples, sensing device 154 and/or camera 172 may directly communicate with computing device 156 via network 176 without computing device 174. Sensing device 154 may directly communicate with an officer device such as law enforcement officer 162's smartphone, tablet, smartwatch, etc. via network 176.

Computing device 156 may be configured to execute one or more AI models. Computing device 156 may be configured to execute the one or more AI models to generate actionable insights for law enforcement officer 162. 8.

Computing devices 156 may correspond to server computing device 104 (or client computing device 110) as depicted in FIG. 1A. Computing device 156 may provide cues or actionable insight, provided by AI models, such as AI models 102 and/or 142. In some examples, computing device 156 may provide cues and actionable insights together. Further, when computing device 156 is to generate cues, it is to be understood that actionable insights can be generated instead of cues. Cues may be generated instead of, or in addition to, actionable insights. Cues may include visual, verbal, haptic, olfactory, or sound signals which provide an indication that bias may be occurring or likely to occur. Actionable insights may include recommendations or instructions for the law enforcement officer 162 to stop or prevent biased actions or communications. Actionable insights and cues can be provided to the law enforcement officer to help reduce the amount of potential conflict when engaging with suspects or change the course of interaction or behaviors of the law enforcement officer to reduce bias. In some instances, cues or actionable insights may be provided to the law enforcement officer when the law enforcement officer does not follow or object to the actionable insights or cues, respectively.

Computing device 174, which can correspond to client computing device 110 of FIG. 1A may be connected to law enforcement vehicle 152 or held or otherwise attached to law enforcement officer 162. The computing device may receive the data captured by sensing device 154 and/or camera 172 and send the captured data to computing device 156 for processing by the AI model. Computing device 174 may communicate with computing device 156 via network 176 which may correspond to network 118 depicted in FIG. 1A. In some instances, sensors may transmit captured data directly to computing device 156 via network 176.

Display 160 may be a display connected to law enforcement vehicle 152 or a portable electronic device carried by law enforcement officer 162, such as, a smartphone, smartwatch, tablet, laptop, etc. Display 160 may correspond to output device 140 depicted in FIG. 1A. Display 160 may output actionable insights and/or cues to the law enforcement officer 162. Although only one display is depicted in FIG. 1B, there may be any number of displays connected to law enforcement vehicle 152 and/or carried or otherwise attached to law enforcement officer 162. Display 160 may communicate with computing device 156 and/or computing device 174 via network 176.

Law enforcement vehicle 152 can correspond to any type of vehicle the law enforcement officer drives to perform the law enforcement officer's duty. In some instances, no law enforcement vehicle may be present. Headphone 170 may be one of the output devices 140 depicted in FIG. 1A. Headphone 170 may receive actionable insights and/or cues, such as generated by an AI model executing on computing device 156 and output the actionable insights and/or cues to the law enforcement officer 162.

Suspect 158 may be an individual with or without criminal history. Suspect 158 may be an individual pursued by law enforcement officer 162 or an individual who is being stopped by law enforcement officer 162.

During the policing scenario illustrated in FIG. 1B, sensing device 154 and/or camera 172 may capture information about suspect 158 and send the captured data to computing device 156. Sensing device 154 and/or camera 172 may capture behavioral information about suspect 158. For example, sensing device 154 and/or camera 172 may record video or audio information of suspect 158 while law enforcement officer 162 is engaging with suspect 158. Sensing device 154 may record suspect 158's voice and film the actions of the suspect 158, which may illustrate the suspect's demeanor. Sensing device 154 and/or camera 172 may also capture the voice and film the actions of law enforcement officer 162, which may illustrate the law enforcement officer's demeanor.

Computing device 156 may receive the above information and apply the AI models to the data captured and provided by the sensors and generate actionable insights and/or cues for law enforcement officer 162. In some instances, the AI model may process data received from a dispatcher, or any other input data, as described herein.

Cues and/or actionable insights generated by the AI model may be generated particular to a law enforcement officer's personal trait. For instance, if law enforcement officer 162 is sensitive to scents, cues may include outputting certain scents indicating that when law enforcement officer 162's actions are or are likely to start being biased. In this example, an olfactory device such as a scent diffuser may be connected to law enforcement vehicle 152 and/or law enforcement officer 162 such that a scent the law enforcement officer finds repugnant is output when a cue or actionable insight is received from the AI model. In some instances, computing device 156 may activate the scent diffuser when a cue or actionable insight is received from a computing device executing the AI model, such as computing device 156. In another example, if law enforcement officer 162 is sensitive to certain sounds or voices, cues may be output to the law enforcement officer 162 using such sounds or voices via earphones or headphones 170 or other such output devices to indicate that law enforcement officer 162's behaviors or speech is biased or may become biased.

Computing device 156 may generate actionable insights in the form of verbal, written, and/or visual instructions that may help reduce the conflict between law enforcement officer 162 and suspect 158. Such guidance may be transmitted to law enforcement vehicle 152. Law enforcement vehicle 152 may send the actionable insights to be displayed on a display 160 such that law enforcement officer 162 may read or listen to them prior to initiating an interaction with suspect 158. Law enforcement officer 162 may use other devices such as earphones or headphone 170 to receive the actionable insights instead of, or in addition to, any other visual instructions.

Computing device 156 may determine the identity of suspect 158, which may include the emotional and behavioral characteristics of suspect 158 based on the data received from sensing device 154. Computing device 156 may similarly detect the emotional and behavioral characteristics of law enforcement officer 162 based on the captured data using sensing device 154. Such information may be provided to the AI model for processing.

Law enforcement officer 162's action and the reaction of suspect 158 during the interaction may be monitored and recorded by sensing device 154. The captured data may be sent and computing device 156 may use the data to validate the AI model that was generated before the current interaction between law enforcement officer 172 and suspect 158 as illustrated in FIG. 1B. The AI model that was generated before the current interaction may include the AI model trained with the outcome data of the simulated training session designed to improve law enforcement officer's unbiased decision-making processes. Human experts may assist in determining the generated model is biased or unbiased relative to real-world observations. Human experts may provide feedback to computing device 156 and computing device 156 may update and refine the model to improve using the data captured during the interaction. This refined model can allow the model to improve, remaining accurate and unbiased in similar situations in the future.

When law enforcement officer 162 is not interacting with suspect 158 or law enforcement officer 162 is participating in a training process, computing device 156 may assist law enforcement officer 162 in the unbiased decision-making training process. Law enforcement officer 162's heart rate and physiological markers of stress may be monitored and used to formulate a mindfulness exercise program for law enforcement officer 162 to reduce the likelihood of biased decision-making in stressful situations. In some examples, computing device 156 may include a law enforcement officer 162's personal electronic devices such as tablets, smartphones, or PC, and the above-described process can be processed using the AI model stored on the personal electronic devices. Any results obtained from the above training process may be provided to the AI models and the AI models may be retrained to further refine the unbiasedness of the actionable insights.

Figure 2A:
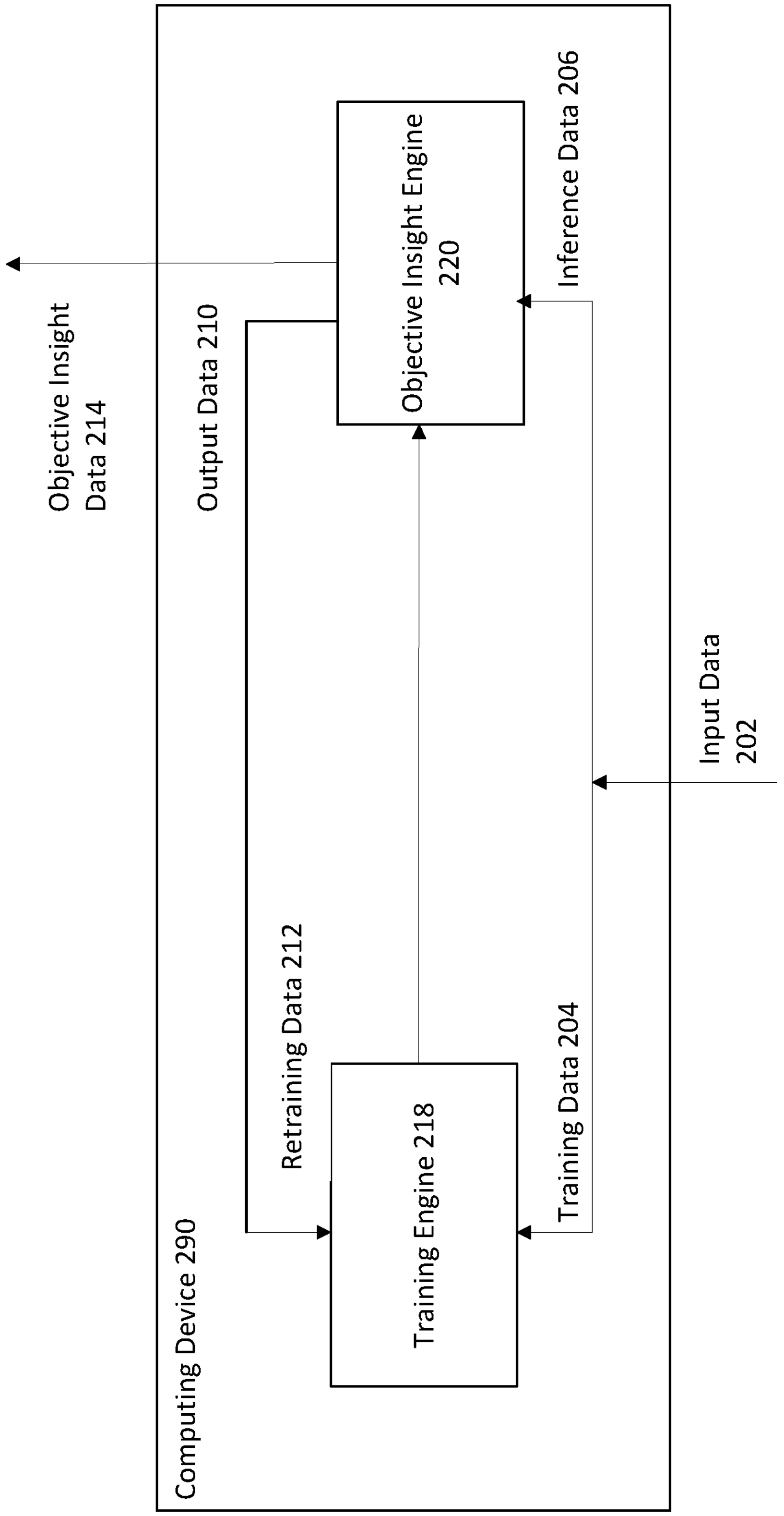
FIG. 2A is a block diagram illustrating an example actionable insights generation process using AI models according to aspects of the disclosure.

FIG. 2A depicts a flow diagram of an example actionable insights generation process using AI models. Computing device 290 corresponding to server computing device 104 or client computing device 110 receives input data. The input data may include training data 204 and/or inference data 206.

The computing device 290 can receive the input data 202 as part of a call to an application programming interface (API). As another example, the computing device 290 can receive the input data 202 from a storage medium, such as remote storage 114 connected to one or more computing devices over the network as depicted in FIG. 1A. As yet another example, the computing device 290 can receive the input data 202 from a user interface on a client computing device.

The input data 202 can correspond to real-time data streams of publicly available data and/or proprietary data. For example, the input data 202 can include training data 204 associated with training one or more AI models and inference data associated with providing actionable insights. Input data 202 may include formal law enforcement reports, video and/or audio data captured by a law enforcement officer's body camera, data relating to prior interactions with criminal suspects or offenders, etc. Input data 202 may also include real-time data captured using a variety of sensors attached to law enforcement bodies, law enforcement vehicles, or any other surveillance systems available at the time of the interactions between law enforcement officers and suspects. As described herein in connection with FIG. 1B, input data 202 may also include captured video or audio information of suspect 158 while law enforcement officer 162 is engaging with suspect 158. Input data may also include suspect 158's captured voice and behaviors.

In some examples, input data 202 may include information that can be sent from a dispatcher or policing database. Such input data may include information that related authorities knowingly and willingly offer for specific purposes. Any individuals known to the local law enforcement department and law enforcement officers, fire department, hospitals, clinics, shelters, food kitchen, public transit, departments of health, human services, social services, etc., can consent to provide related data that can serve as training data 204 for training AI models.

The computing device 290 may train AI models with training data 204. The training data 204 may include input data 202 comprising captured video or audio information of suspect 158 while law enforcement officer 162 is engaging with suspect 158. Input data 202 may also include suspect 158's captured voice and behaviors. The training data 204 can be split into a training set, a validation set, and/or a testing set. An example training/validation/testing split can be an 80/10/10 split, although any other split may be possible.

The trained AI models may then generate output data 210 as a set of computer-readable instructions, such as one or more computer programs. Output data 210 may be forwarded to one or more other computing devices configured for translating the output data 210 into an executable program written in a computer programming language and optionally as part of a framework for providing actionable insights. The AI models may generate objective insight data 214 as part of output data 210 using inference data 206. Objective insight data 214 may include actionable insight. The inference data 206 may include publicly available data and/or proprietary data associated with law enforcement officer 162 and suspect 158. Inference data 206 may include data sent by a dispatcher or data obtained by the sensing device 154 and/or camera 172. Inference data 206 may be used to generate actionable insights or cues. For example, inference data 206 can include data corresponding to the interaction between law enforcement officer 162 and suspect 158, and historical data such as information about suspect 158. Inference data 206 may include any historical data related to law enforcement officer 162 and suspect 158 stored in a database. For example, inference data 206 may include any historical data indicating the use of verbal or behavioral violence committed by law enforcement officer 162 while conducting traffic stops in the past. Inference data 206 may also include any stored data relating to suspect 158 such as criminal records, psychological reports, mental facilities report, and correction facilities reports. The inference data 206 can further include physiological data of the law enforcement officer, such as heart rate or body temperature, measured by sensors to assist the AI models. For example, the AI models may receive the law enforcement officer 162's physiological data and generate actionable insights or cues based on the physiological data. If law enforcement officer 162's heart rate indicates a stressful situation, the AI models may generate cues to avoid a biased action for law enforcement officer 162 such that law enforcement officer 162 may avoid threatening or taking physical action against suspect 158 without reason. Such cues may be provided to law enforcement officer 162 more quickly than the law enforcement officer 162's heart rate was lower or slowing down.

The AI models may generate actionable insights in the form of action guides, e.g., verbal or visual instructions or guides, to avoid or reduce conflict between law enforcement officers and criminal suspects. For example, the actionable insights may include cues to associate with a trained response or instructions for law enforcement officers confronting a formal offender on the street while patrolling the neighborhood or as described in connection with FIG. 1B during a traffic stop. The cues or actionable insights may include signals or commands output on the personal device of the law enforcement officer. In the example of FIG. 1B, display 160 may display the verbal or visual instructions or cues. For example, display 160 may include law enforcement officer 162's mobile phone. Law enforcement officer 162's mobile phone may display "Do not stand too close to suspect 158 since suspect 158 may be carrying a weapon based on the historical record". Such a statement may be displayed using text or read using a voice output system. The AI models can also be configured to send the actionable insights to a storage device for storage and later retrieval. The AI models can be trained to send the output data for display, such as on a display of a client device.

The computing device 290 may use the actionable insights as retraining data 212. Retraining data 212 may be used to improve the outputs of the AI models. The retraining data 212 may also include. For example, feedback for improving training of the one or more AI models. The feedback can be provided by law enforcement officers who have confronted a criminal suspect and resolved a potential conflict using the actionable insights generated by the AI models. The retraining data 212 may also include any feedback provided by the law enforcement officer after confronting and arresting criminal suspects. Such feedback may include detailed answers to a questionnaire generated by one or more AI models. The retraining data 212 may also include, as described in connection with FIG. 1B, any test results or feedback provided by the law enforcement officers after completing AI simulations. The retraining data 212 can correspond to improving output for one or more AI tasks for providing one or more actionable insights. The retraining data 212 can be split into a retraining set, a revalidating set, and/or a retesting set. An example, the retraining/revalidation/retesting split can be an 80/10/10 split, although any other split may be possible.

According to some examples, the AI models can be trained or retrained according to one of a variety of different learning techniques. Learning techniques for training the AI model can include supervised learning, unsupervised learning, semi-supervised learning techniques, parameter-efficient techniques, and/or reinforcement learning techniques. For example, the training data and/or retraining data can include multiple training examples that can be received as input by the AI model. The training examples can be labeled with a desired output for the AI model when processing the labeled training examples. The label and the output can be evaluated through a loss function to determine an error, which can be backpropagated through the AI model to update weights for the AI model. As another example, a supervised learning technique can be applied to calculate an error between outputs, with a ground-truth label of a training example processed by the AI model. Any of a variety of loss or error functions appropriate for the type of task for which the AI model is being trained can be utilized, such as cross-entropy loss for classification tasks or mean square error for regression tasks. The gradient of the error with respect to the different weights of the candidate AI model on candidate hardware can be calculated, for example using a backpropagation model, and the weights for the AI model can be updated. The AI model can be trained until stopping criteria are met, such as a number of iterations for training, a maximum period of time, a convergence, or when a minimum accuracy threshold is met.

The one or more AI models can include machine learning models, statistical models, propensity scoring models, regression discontinuity models, potential outcomes models, quasiperiodic models, fractal models, and/or large language models, such as neural networks or deep neural networks, which can all be used in combination or in part for outputting recommended actions. The computing device can use the one or more AI models to output actionable insights based on comparisons to historical situations. The one or more AI models can include any machine learning model architecture, which may refer to characteristics defining the AI model, such as characteristics of layers for the model, how the layers process input, or how the layers interact with one another. The architecture of the machine learning model can also define the types of operations performed within each layer.

The computing device 290 can further use the one or more AI models to identify social identities and behavioral characteristics of each individual and determine human values associated with each identified social identity and behavioral characteristic of each individual. For example, the AI models may be trained to infer human characteristics such as kindness, generosity, humility, greed, prejudice, and hatred and assign symbols or numbers to represent each inferred human characteristic. The AI models may be adapted to the principle of stoichiometry to define and represent the entities' social identities in a more complex but unbiased manner. For example, the AI models may determine that kindness*2+humility*2=generosity using stoichiometry. Once the AI models determine that an individual possesses the traits of kindness in the magnitude of 2 and humility in the magnitude of 2, the AI model may add "generosity" to the identity of the entity.

According to other examples, the computing device 290 may generate realistic training simulations where law enforcement officers may practice responding to suspects based on the specifics of the situation without relying on bias. The computing device 290 may train the AI models to randomize the appearance and behaviors of the virtual suspects involved and allow law enforcement officers to experience a variety of interactions with different parties. The computing device 290 using AI models may monitor the law enforcement officers' performances in a variety of simulations and generate detailed and objective feedback on the law enforcement officers' performances. Such feedback may be provided to the law enforcement officers such that the law enforcement officers may understand when and how the biases might have influenced law enforcement officers' actions.

The computing device 290 may analyze the law enforcement officers' decisions and actions during the simulated scenario and highlight the instances where the law enforcement officers may have been influenced by bias. The computing device 290 may break down the law enforcement officers' decision-making processes, such as reaction times and communication styles. The computing device 290 may use the above data as retraining data and send the data to train the AI models. The virtual training can be ongoing allowing for continuous improvement. Human experts can provide feedback on the result of the virtual training. The computing device 290 may train the AI models to adapt to the law enforcement officers' progress and provide more challenging scenarios as the law enforcement officers' unbiased performance levels improve and continually reinforce the importance of unbiased decision-making. The more complex and nuanced virtual scenarios may include situations that are designed to challenge the law enforcement officers' improved skills and ensure that the law enforcement officers can apply what the law enforcement officers have learned in a variety of contexts.

Figure 2B:
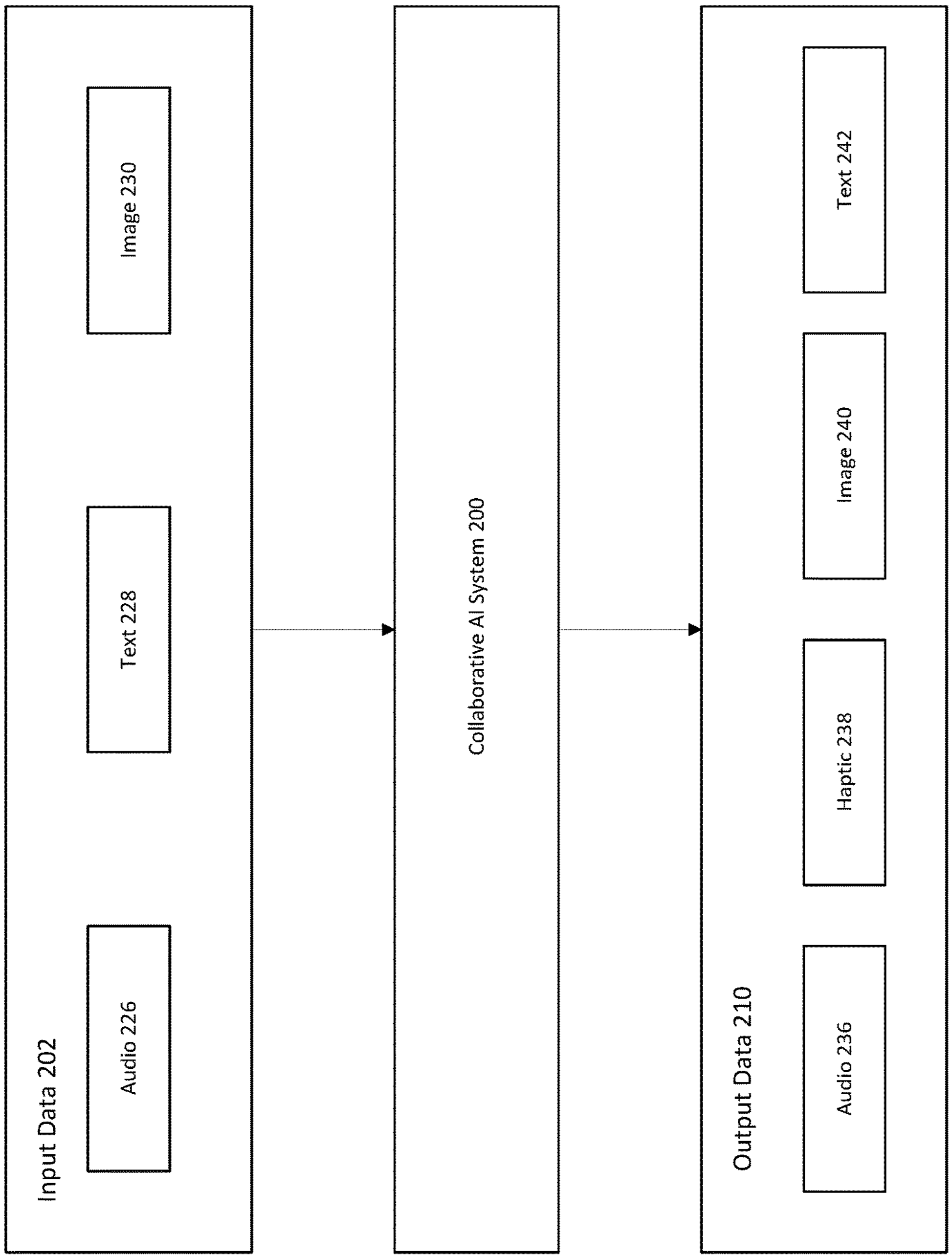
FIG. 2B is a block diagram illustrating an example collaborative AI system receiving input data and outputting output data according to aspects of the disclosure.

FIG. 2B depicts a block diagram illustrating an example collaborative AI system with example input and output. The computing device of collaborative AI system 200 may receive input data 202. Input data 202 may include audio 226, text 228, and image 230. Audio 226 may include any audio data captured when a law enforcement officer confronts and questions suspects. For example, audio 226 may include any conversation reactions or sounds made by both law enforcement officers and suspects. Audio 226 may include call recordings, meeting recordings, and media recordings (e.g., TV, radio, podcast, etc.). Text 228 may include the suspect's vehicle license number, the suspect's driver's license number, the law enforcement officer's badge number, etc. Text 228 may include emails, documents, chat messages, etc. Image 230 may include photographs or video filmed using body cameras or any other types of sensors attached to law enforcement officer's vehicles. Image 230 may include photographs, videos, video stills, 3D signals, and any other visual data captured by sensors. As illustrated in FIG. 1B, sensing device 154 or law enforcement officer 162's electronic device may capture the image of text 228. Audio 226 and image 230 may also be captured using sensing device 154. Audio 226, text 228, and image 230 may be analyzed by collaborative AI System 200. Collaborative AI system 200 may analyze audio 226, text 228, and image 230 to train AI models and generate actionable insights as output data 210.

As described in detail in connection with FIG. 2A, a computing device 290, which may be compared to server computing device 104 and/or client computing device 110)

may train the AI models to learn reactions between the law enforcement officer and suspect based on audio 226, text 228, and image 230. The computing device 290 may generate actionable insights for law enforcement officer 162 in real-time to follow as law enforcement officer 162 continues the questioning or investigation as output data 210. The computing device which trains the AI model need not be the same computing device that executes the AI model.

Output data 210 may include audio 236, haptic 238, image 240, or text 242. Collaborative AI system 200 may generate text 242 corresponding to the above-described actionable insights. Audio 236 may include a machine-based voice system that reads the generated text 242 via a speaker system such as law enforcement officer 162 may listen using a variety of electronic devices, such as car stereo systems, mobile phones, tablets, laptops, smartwatches, headphones, earbuds, etc. Haptic 238 may include a sense of touch by creating a combination of force vibration and motion sensation to the user using various electronic devices. Law enforcement officer 162's vehicle may include a prompt system that may display sentences using different colors according to the importance of the message. Image 240 may include a video that demonstrates how law enforcement officer 162 should approach and interact with suspect 158. Image 240 may include a closed captioning system that may explain the image being displayed. Image 240 may be transmitted to law enforcement officer 162's personal electronic devices or any other displaying devices attached to law enforcement vehicle 152.

Figure 3:
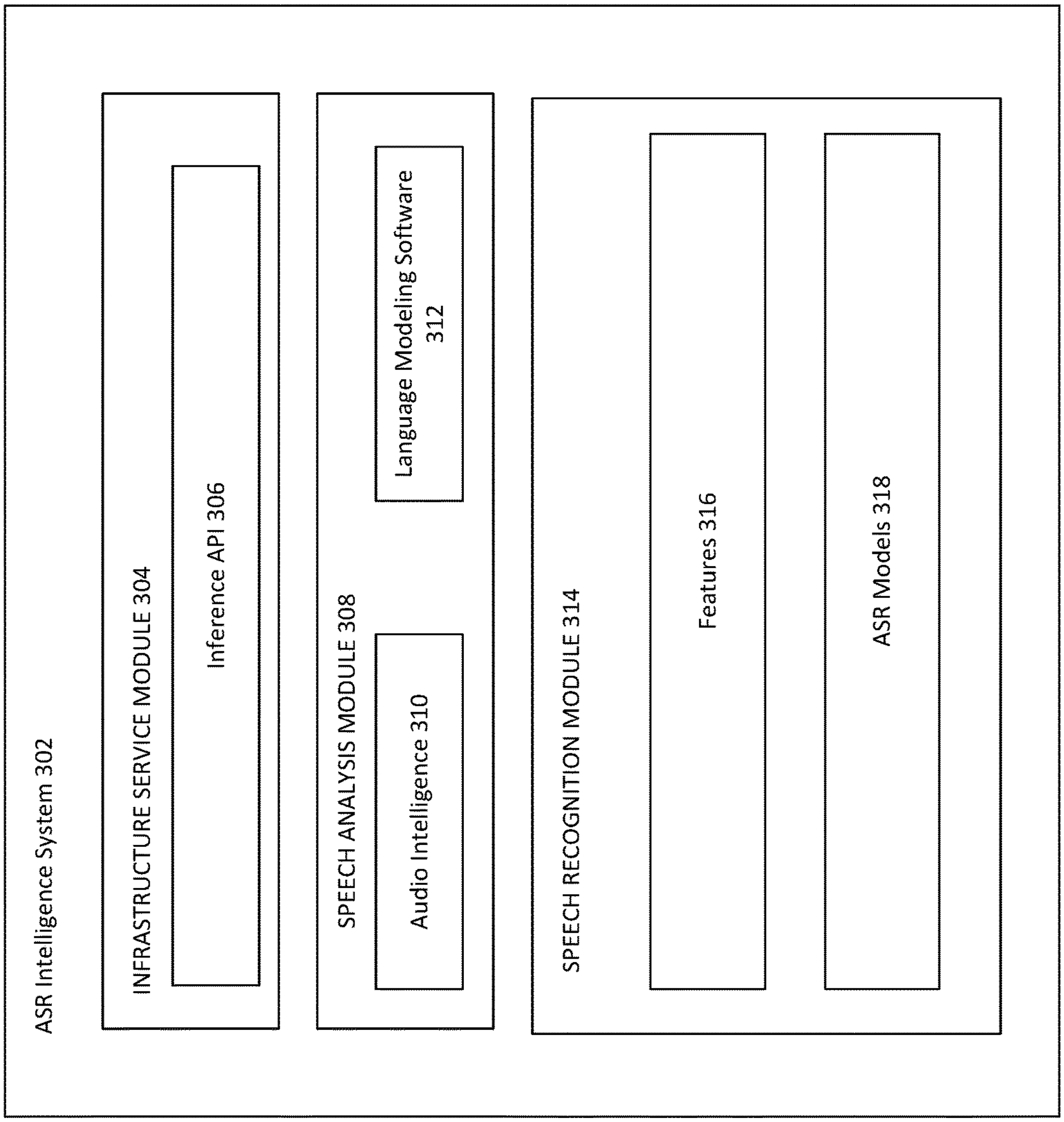
FIG. 3 is a block diagram illustrating an example automatic speech recognition (ASR) intelligence system according to aspects of the disclosure.

FIG. 3 depicts a block diagram illustrating an example intelligent system for automatic speech recognition (ASR). ASR intelligence system 302 may include infrastructure service module 304, speech analysis module 308, and speech recognition module 314. Infrastructure service module 304 may include inference API 306. Inference API 306 may include an application programming interface specialized for receiving data and generating inference data for specialized purposes. For example, ASR intelligence system 302 may detect the speech of law enforcement officer 162 and suspect 158 using devices such as microphones. ASR intelligence system 302 may use the detected speech information as speech input data for further analysis as described in more detail below. ASR intelligence system 302 can receive the speech input as part of a call to an application programming interface (API) as described in connection with FIG. 1A. Inference API 306 may be configured to only discern relevant speech parts from any other background noise or speech made by any person other than law enforcement officer 162 or suspect 158. Speech analysis module 308 may use audio intelligence 310 to redact personal information or confidential information related to law enforcement officer 162. Audio intelligence 310 may also moderate the content of the speech input. Context or topics of the conversations between law enforcement officer 162 and suspect 158 may be sorted out and grouped together according to the common themes, topics, or relevancies. The sentiment of law enforcement officer 162 and suspect 158 may be determined. Audio intelligence 310 may use an AI model to determine whether law enforcement office 112 is emotionally aggravated or calm when questioning suspect 158. Audio intelligence 310 may also determine the emotional state of suspect 158 from the discerned speech information spoken by suspect 158.

Language modeling software 312 may refer to software such as the software developed to analyze large text collections of data and support research and development of information retrieval and text mining software. It is to be appreciated that any other software that can leverage a large language model (LLM) with spoken and written data may be used to understand and assist in determining speech topics, sentiment analysis, and tone and/or emotions detection.

Speech recognition module 314 may recognize or discern features 316. Features 316 may include custom vocabulary spoken by law enforcement officers, speaker labels (e.g., labeling law enforcement officer 162, suspect 158), detected profanity, and timestamps of the keywords spoken by law enforcement officer 162 and/or suspect 158. Features 316 may also include confidence scores of identified labels, profanity, keywords, and custom vocabulary. Features 316 may also include custom formatting of language or styles of speech spoken by law enforcement officer 162 and/or suspect 158.

ASR model 318 may refer to software that may automatically transcribe the speech input that ASR intelligent system 302 receives. ASR model 318 may use a pre-configured language model that can help evaluate speech input. ASR model 318 may receive speech input and find the most likely sequence of the text that could result in the given audio. ASR models 318 may generate the transcription of the conversations between law enforcement officer 162 and suspect 158 with appropriate labels of each person and send it to collaborative AI system 200 as text 228. ASR models 318 may also be used to confirm whether the identified speakers of the speech input are truly law enforcement officer 162 and suspect 158.

Figure 4:
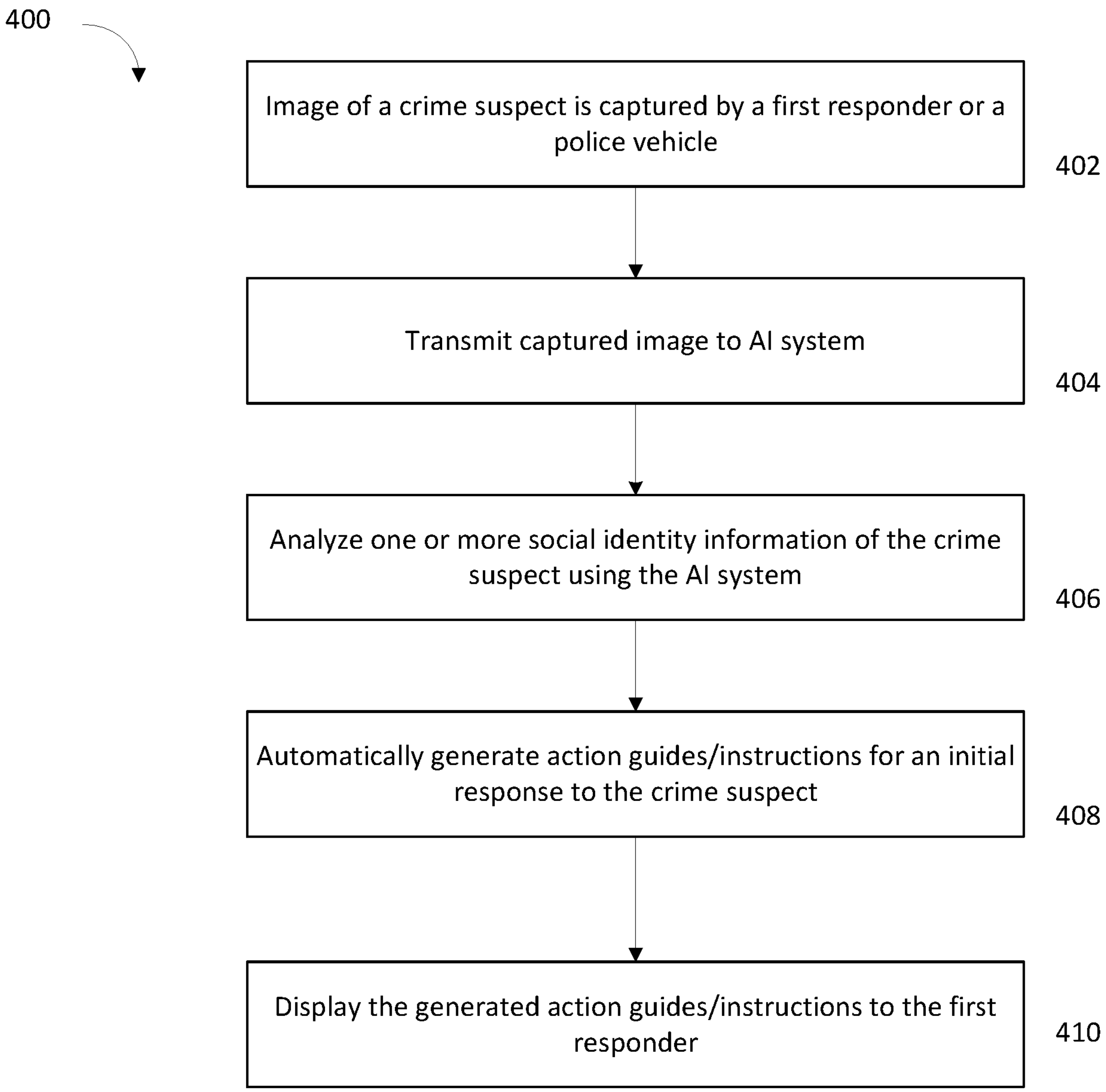
FIG. 4 is a flow diagram of an example process for providing actionable insights to a law enforcement officer using collaborative AI systems according to aspects of the disclosure.

FIG. 4 depicts a flow diagram of an example process 400 for providing actionable insights to a law enforcement officer using the collaborative AI systems. According to block 402, information of a crime suspect may be captured by a first responder or a law enforcement vehicle. Sensors such as sensing device(s) 154 described above in connection with FIG. 1B may capture audio, video, or image information of a criminal suspect or formal offender. The captured data may be transmitted to the computing device connected to a law enforcement vehicle or a server computing device. The sensing device may be communicable with the computing device and may automatically determine whether an individual is actually a criminal suspect based on the captured facial image and voice information. The sensors may continue to capture audio or video data and transmit the data to the server computing device as the first responder interacts with the individual.

According to block 404, the captured data may be transmitted to train the AI models. The captured image or other types of data may be analyzed by the AI models. The computing devices may include pre-trained AI models that may be used for analysis and comparison with the captured data.

According to block 406, the computing device may train the AI models with the captured image to determine actionable insights for the first responder. The actionable insights may be determined based on the behaviors and conversations between the individual and first responder when the sensing device was capturing the video data.

According to block 408, the computing device may train the AI models to generate unbiased actionable insights. The AI models may compare the captured data with historical data of similar profiles or criminal data related to the same individual.

According to block 410, the generated actionable insights may be displayed on a device held by the first responder or on a display device equipped within the law enforcement vehicle. The first responder may receive the actionable insights displayed on a computer screen equipped within the law enforcement vehicle or any other electrical device such as a smartphone, tablet, smartwatch, etc.

Figure 5:
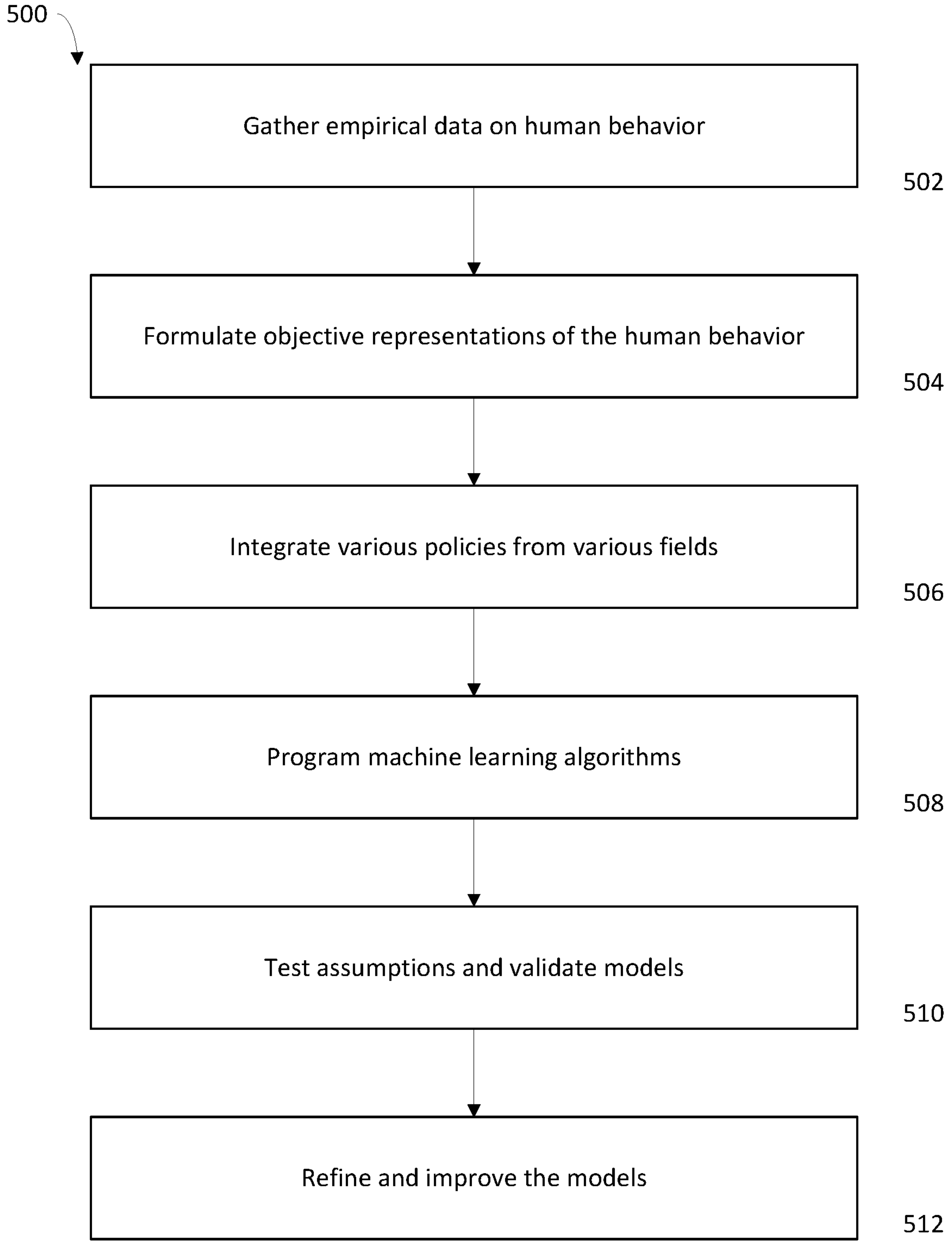
FIG. 5 is a flow diagram of an example process for training the AI models for unbiased policing according to aspects of the disclosure.

FIG. 5 depicts a flow diagram of an example process 500 for training the AI models for unbiased policing. Process 500 can be performed on a system of one or more computers in one or more locations, such as server computing device 104 and/or client computing device 110 as depicted in FIG. 1A. According to block 502, the collaborative AI systems may gather empirical data on human behaviors. The computing device may collect data from various fields such as computer science, neuroscience, psychology, sociology, anthropology, philosophy, and/or psychiatry. In one example, the computing device may provide a variety of simulated examples of interactions between law enforcement officer 162 and suspect 158 from FIG. 1B. The computing device may train the AI models with information as to the law enforcement officer 162's past traumatic experiences to predict the behaviors of law enforcement officer 162 when law enforcement officer 162 stops suspect 158 for investigation. According to block 504, the computing device may train the AI models with the collected data to identify patterns, tendencies, and regularities in human behavior. Similarities and connections across different disciplines can be identified to determine potential universal principles. The AI models may be trained with various frameworks. Example frameworks may include social identity complexity (SIC) and Bayesian affect control (BAC). The computing device may train the AI models to identify the social identities and psychological dynamics at play to provide interventions that can address both interpersonal and group-level factors that contribute to potential conflict. The AI models may be trained to predict potential conflict that can arise out of the interaction between law enforcement officer 162 and suspect 158. For example, the potential conflicts may include suspect 158's attempts to escape the scene, law enforcement officer 162's biased belief in suspect 158's possessing deadly weapons, despising or derogatory statements that law enforcement officers may assert, etc. The computing device may train the AI models to predict patterns and tendencies of the interactions between law enforcement officer 162 and suspect 158.

The computing device may train the AI models to translate the identified patterns and tendencies into objective representations using the axiomatic set policies. These policies can be implemented with quasi-realism and non-cognitivism to program an unbiased AI model. Quasi-realism holds a position that reality is not purely objective or subjective, but rather a combination of both. Non-cognitivism may define that ethical statements are not truth-apt or cognitive, but rather expressions of moral attitudes or emotions. The computing device may implement the AI models with AST, quasi-realism, and non-cognitivism to provide a framework for programming an AI model that is able to navigate complex ethical situations. Each objective representation may include variables and coefficients. Variables may represent law enforcement officer 162 and suspect 158's human traits such as virtues or vices. Coefficients may be determined by the computing device based on the analysis of the collected historical and empirical data. The coefficients may represent the weights of each identified human trait with respect to law enforcement officer 162 and suspect 158.

According to block 506, the computing device may train the AI models with chemistry policies that have been used to understand the behavior of molecules and their interactions, such as stoichiometry and/or stereochemistry. According to some examples, the computing device may train the AI models by applying grand observer policies to draw parallels between human behavior and particle behavior in the context of stoichiometry and stereochemistry. The grand observer policies may refer to a framework that the behavior of particles and objects in the physical world is influenced by the presence of an observer. Similarly, quorum sensing and heuristic matching, concepts used in mycology and social identity complexity, respectively, can be provided to the AI models f. By integrating the above principles, the computing device may train the AI models to develop a comprehensive framework for understanding the complex human behaviors of law enforcement officer 162 and suspect 158. The computing device may train the AI models with stoichiometry and stereochemistry to balance the coefficients of each identified human trait of law enforcement officer 162 and suspect 158 which is objectively represented at block 504.

According to block 508, the AI models may be programmed to implement objective representations and models. For example, Bayesian flow network (BFN) may be used to generate a probabilistic graphical model to represent the reason for uncertainty in complex systems. The machine learning models may be used to repair or mitigate the effects of bias in machine learning models. For example, a high-performing messaging platform such as NATs and/or MQTT can be used to process real-time data and transmit the real-time data to the AI model for further analysis. For example, as law enforcement officer 162 and suspect 158 are dialoguing, the AI models may update in real-time the coefficients of the objective representations to eliminate any potential bias.

According to block 510, the underlying assumptions of the AI models may be tested and validated. The predictions of the AI models may be compared with real-world observations and empirical evidence. For example, the computing device may train the AI models to generate hypotheses about relationships between virtues, vices, and forms of human behavior, such as "individuals who possess the virtue of compassion are more likely to engage in altruistic behavior". The computing device may train the AI models to convert the above hypothesis to objective equations. The computing device may train the AI models to test the hypothesis against real-world observations and empirical evidence. For example, the above objective model may be developed to predict the likelihood of an individual engaging in altruistic behavior based on the level of compassion. In the example involving law enforcement officer 162 and suspect 158, the computing device may train the AI models to determine the level of compassion possessed by law enforcement officer 162 and predict the likelihood of law enforcement officer 162 engaging in stopping and investigating suspect 158 in a non-violent or peaceful manner.

The AI models may be validated by comparing the prediction with real-world observations and empirical evidence. For example, further studies of the relationship between compassion and altruistic behavior can be conducted and used to further refine the AI model and improve its accuracy. The processes of hypothesis generation, objective modeling, and model validation using non-cognitivism, quasi-realisms, and empirical evidence can be repeated with each cycle refining and improving the AI models. Moreover, the computing device may train the AI model to monitor the dialogues between the law enforcement officers and suspects to validate the pre-generated prediction in real time. In the above example involving law enforcement officer 162 and suspect 158, the predicted non-violent or peaceful manner of interaction between law enforcement officer 162 and suspect 158 can be continually validated based on the dialogue or demeanors of law enforcement officer 162 and suspect 158 captured in real-time.

According to block 512, the computing device may refine and improve the AI models. By iterating the processes and further refining the AI model, a more nuanced and accurate understanding of the relationships between virtues, vices, and human behaviors can be accomplished. The computing device may train the AI models to apply the objective representations in specific contexts and populations with shared parameters to define behavioral constants within limits of applicability. Individual differences, cultural norms, and social context may be considered to enhance the predictability and usefulness of the objective representations. According to some examples, the computing device may train the AI models to improve the objective representations using personal historical data, ethnicity, age, other social information such as family size, and demographic information relating to law enforcement officer 162 and suspect 158.

Figure 6:
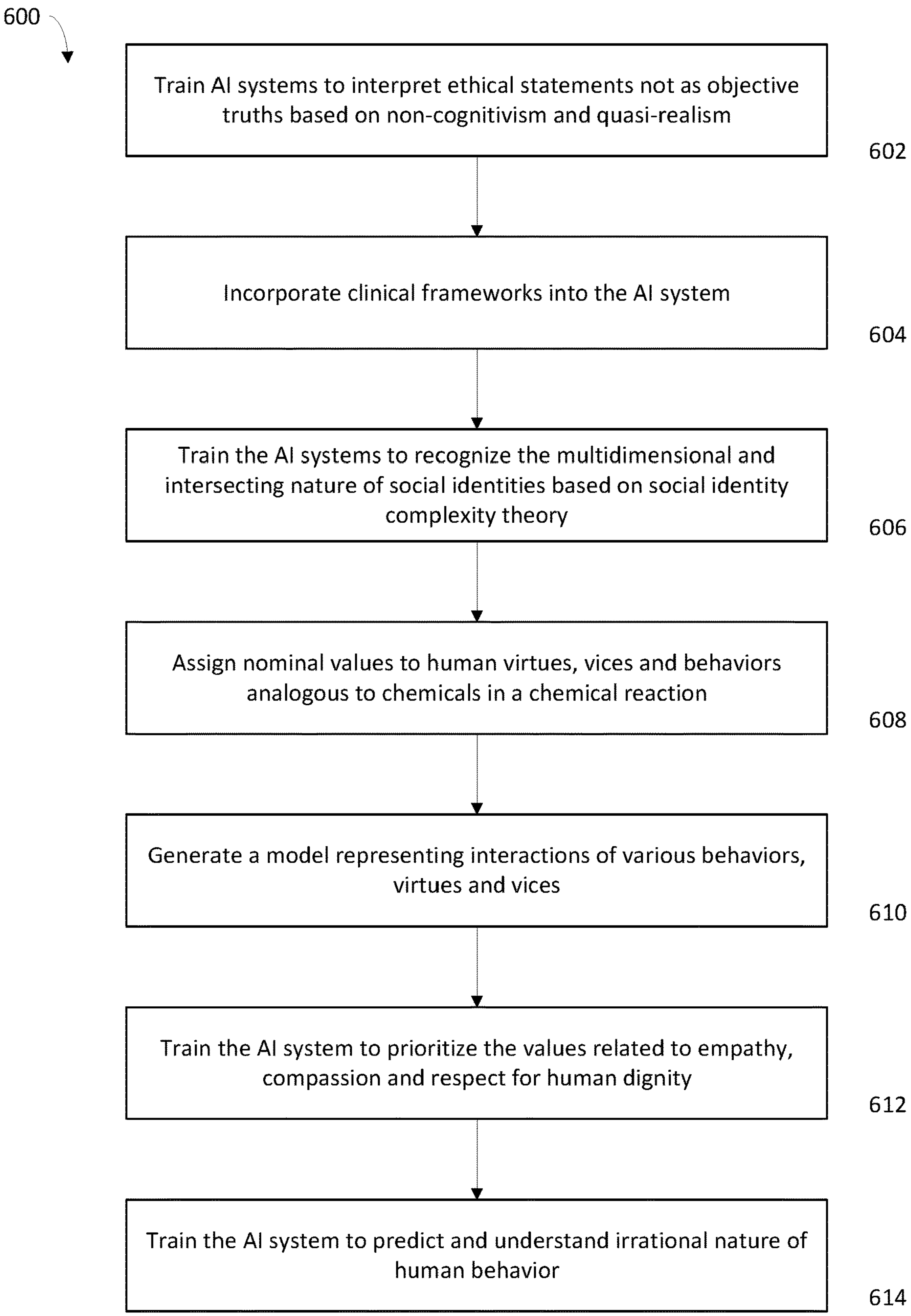
FIG. 6 is a flow diagram of an example process for training AI models to understand human behavior according to aspects of the disclosure.

FIG. 6 depicts a flow diagram of an example process 600 for training AI models to understand human behavior. The example process can be performed on a system of one or more computing devices in one or more locations. According to block 602, the computing device may train the AI models to interpret ethical statements without inferring objective truths adopting non-cognitivism and quasi-realism. For example, the computing device may train the AI models with a person's behaviors, utterances, and/or conversations with other persons and discover terms relating to human characteristics. The computing device may configure the sensors to continuously monitor the law enforcement officer's daily behavior, utterances, demeanors, work documents, such as reports written by the law enforcement officer, etc., and train the AI models to identify the human traits such as virtues or vices. For example, the computing device may train the AI models to determine whether law enforcement officer 162's level of compassion, integrity, selflessness, etc. The computing devices may train the AI models to avoid overly simplifying or stereotyping the traits of law enforcement officer 162 by retraining the AI models with retraining data.

According to block 604, clinical frameworks may be incorporated into the AI models. A framework such as a diagnostic and statistical manual (DSM) may be used to provide a useful structure for the AI models to understand certain aspects of human behaviors. DSM may refer to a manual to diagnose mental disorders. The computing device may also train the AI models to understand the limitations of the above framework so as not to constrain individuals into rigid mental categories. The computing device may train the AI models to adopt a fundamental methodology of classifying each mental disorder according to the DSM and expand the classifications to entail various human traits or behaviors that fall outside of the DSM categories. The computing devices may also train the AI models with a broad range of data from the above multiple perspectives to gain a holistic understanding of human issues while respecting individual differences and avoiding the reinforcement of harmful stereotypes or biases. The computing device may further continually train the AI models to collect a sufficiently diverse and representative dataset that encompasses a broad range of perspectives on a societal issue while incorporating research studies and government reporting. The computing device can train the AI models to pre-process any data, ensure the data is normalized based on the diagnostics that humans design in a way that the AI models can understand, and then continuously learn once the systems have been initially trained using machine learning techniques.

Post-processing and interpretation using various techniques such as natural language processing and sentiment analysis may be used to interpret the AI model's output in the context of human language and emotions. The AI model's numerical predictions may be converted into descriptive statements and mapped to human-understandable concepts. Various mechanisms may be implemented for ongoing ethical oversight of the AI models that involve regular audits of the system's performance and behaviors as well as a feedback loop that allows users to report any problems or concerns. For the computing device to train the AI models to generate unbiased actionable insights in an unpredictable set of circumstances, the AI models need to be trained with datasets based on a pan-disciplinary approach including expertise in various fields such as psychology, sociology, mathematics, probability, statistics, chemistry, computer science, ethics, and design.

According to block 606, the computing device may train the AI models to recognize the multidimensional and intersecting nature of the social identity of each entity. The computing device may train the AI models to categorize the identities of each entity into multiple categories based on various attributes such as ethnicity, gender, age, clothes an individual wears, cars an individual drives, the individual's patterns in consuming media, certain goods, products, etc. For example, the above social identity may be inferred from the ongoing monitoring of law enforcement officer 162 and such social identity may be used to update the determined human traits of law enforcement officer 162.

According to block 608, nominal values or symbols may be assigned to human virtues, vices, and behaviors. The computing device may train the AI model to identify a number of virtues or vices that exist in human behaviors. For example, a set of core virtues may be identified based on philosophical and religious traditions, including prudence, temperance, courage, justice, etc. Vices may be found in human behaviors. Vices may be moral failings or objectionable behavior such as greed, gluttony, lust, etc. The computing device may assign symbols or numbers to represent each of the above virtues or vices such that the computing device may train the AI system to objectively evaluate an entity's statement or behaviors by assigning the above symbols and numbers and by adjusting, e.g., adding, subtracting, multiplying, and/or dividing the numbers. As a result, a unique set of identities may be assigned to the entity's identity.

According to block 610, the computing device may train the AI models to generate an objective representation representing the interactions of various human traits using stoichiometry. Stoichiometry may involve balancing the reactions or interactions of different behaviors, virtues, and vices which may be balanced using quadratic equations. Such quadratic equations may be used to model and graph the above interactions, providing a visual representation of interactions between two or more entities. For example, the computing device may train the AI model to determine the human traits of both law enforcement officer 162 and suspect 158 and generate an objective model representing the predicted interaction of those human traits. For example, the computing device may train the AI model to assign weights or coefficients for each identified human trait. If the weight assigned to the compassion level of law enforcement officer 162 is low relative to the cruelty level of suspect 158, the computing device may train the AI model to identify and include additional virtues found in law enforcement officer 162's characteristics and balance the quadratic equations. The balanced quadratic equations may be used to provide actionable insights or guidance for law enforcement officer 162 to counteract the high cruelty level of suspect 158 such that the amount of predicted conflict between law enforcement officer 162 and suspect 158 may be reduced to below a predetermined threshold level.

According to block 612, the computing device may train the AI models to prioritize the values related to positive human characteristics, such as empathy, compassion, and respect for human dignity. The AI models may be trained using data that reflects the values related to empathy, compassion, and respect for human dignity. Such data may include stories or excerpts from history, fiction, media assets, other types of artworks, etc. The computing device may train the AI models to prioritize the above values over other virtues or vices described in block 610. For example, when the computing device may train the AI models to generate protocols or actionable insights for law enforcement officer 162 to follow, the computing devices may train the AI models to generate such protocols or actionable insights to promote empathy, compassion, and respect for human dignity. Such actionable insights may include "Approach gently to suspect 158", and "End the sentence with sir/ma'am". "Use positive words as opposed to negative words", etc. Each sentence within the guides may be supplemented with more detailed examples of the use of particular words according to various situations.

According to block 614, the computing device may train the AI models to predict the irrational nature of human behaviors. The computing device may train the AI models with the data related to human irrational behaviors such as behavioral economics and cognitive psychology to understand and predict the often-irrational nature of human behaviors. The computing device may train the AI models to be adapted to behavioral economics or cognitive psychology to analyze any input data the computing device newly receives and dynamically generate objection insight data. In the example involving law enforcement officer 162 and suspect 158, the computing device may train the AI models to provide actionable insights for law enforcement officer 162 to effectively react to any irrational behaviors of suspect 158 predicted by the computing device.

Figure 7:
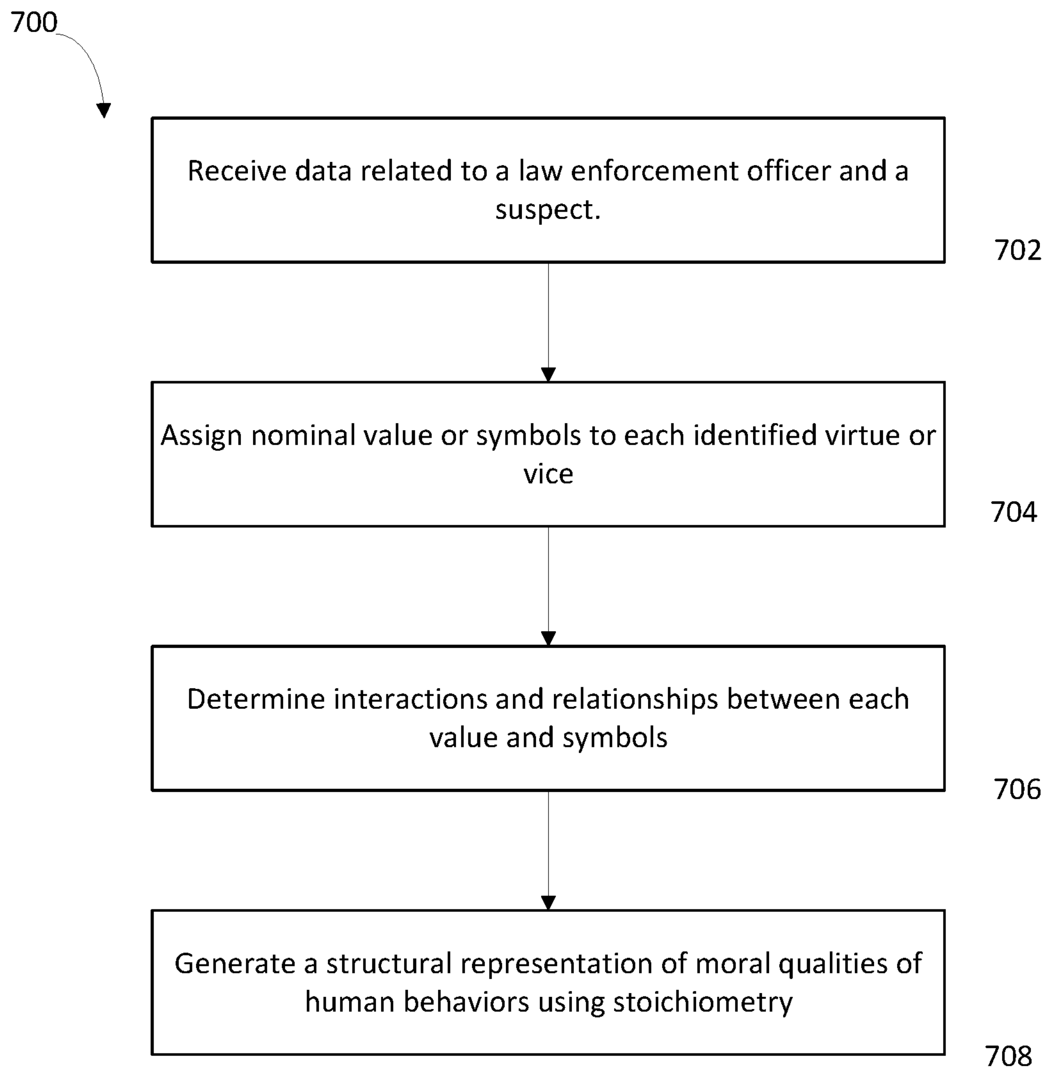
FIG. 7 is a flow diagram of an example process for training the AI models based on the characteristics of a law enforcement officer according to aspects of the disclosure.

FIG. 7 depicts a flow diagram of an example process 700 for training the AI model based on the characteristics of a law enforcement officer. The example process 700 can be performed by one or more computing devices in one or more locations. According to block 702, the computing device may receive a variety of information related to a law enforcement officer and a suspect. For example, psychiatric evaluation, questionnaires can be received from various authorities. Such information may be analyzed to identify characteristics, tendencies, or preferences of the law enforcement officer and suspect. The identified characteristics, tendencies, or preference information may be used to train the AI models. The AI models may be trained to generate an objective representation of the interaction of the characteristics, tendencies or preferences of the law enforcement officer and the characteristics, tendencies, or preferences of the suspect. The objective representation may be represented using various symbols and numbers.

According to block 704, the computing device may train the AI models to assign nominal values or symbols to each identified characteristic, tendency, or preference. For example, the number "1" or the alphabet "w" may be assigned to "wisdom" and "10" or "x" may be assigned to "gluttony". By assigning the numbers or symbols to the characteristics, tendencies or preferences, the computing device may train the AI models to regard characteristics, tendencies, or preferences as abstract symbols or numbers.

According to block 706, the computing device may train the AI models to determine interactions and relationships between each value and symbol using stoichiometry. Each symbol and number may be treated as chemicals in a chemical equation. Such an equation may be used to model a unique relationship between various characteristics, tendencies, or preferences. For example, the computing device may train the AI models with a stereochemistry framework to represent interpersonal relationship dynamics between a law enforcement officer and a criminal suspect. The computing device may train the AI models to describe unique interactions between two or more different symbolically transformed characteristics, tendencies, or preferences.

According to block 708, the computing device may train the AI models to generate a structural representation of characteristics, tendencies or preferences using stoichiometry. The computing device may train the AI models to express unique interactions of two or more different characteristics, tendencies, or preferences using stoichiometry. Stoichiometry may be used to express quantitative relationships between two or more different characteristics, tendencies, or preferences. Stereochemistry, on the other hand, may be used to describe a particular arrangement of different characteristics, tendencies, or preferences.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

The phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as", "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for reducing bias in a policing interaction comprising:
- one or more processors;
- memory storing instructions that, when executed by the one or more processors, cause the one or more processors to perform the instructions, the instructions comprising:
  - receiving, from one or more sensors, input data related to a law enforcement officer and a third party;
  - inputting, the input data into a collaborative artificial intelligence (AI) model, the AI model being that is iteratively trained to detect a risk of biased policing at a scene of the policing interaction based on one or more of characteristics, tendencies, or preferences of the law enforcement officer and one or more of historical policing data associated with the law enforcement officer or simulations of policing activities performed by the law enforcement officer;
  - receiving, from the AI model in response to the AI model determining a behavior of the law enforcement officer is indicative of a risk of biased policing based on the input data, a recommended action for reducing the risk of biased policing at the scene of the policing interaction based on the determined behavior of the law enforcement officer that is indicative of the risk of biased policing, the recommended action being personalized for the law enforcement officer; and
  - transmitting a signal indicating the recommended action to an output device of the law enforcement officer.

2. The system of claim 1, wherein additional input data is input into the AI model, the additional input data including one or more of law enforcement reports comprising criminal records, psychological reports, mental facilities report, correction facilities reports, or dispatch data.

3. The system of claim 1, wherein the input data includes video data and/or audio data, captured using the one or more sensors.

4. The system of claim 1, wherein the one or more sensors include temperature sensors, proximity sensors, accelerometers, infra-red-light sensors, smoke detectors, gas detectors, alcohol sensors, microphones, audio recorders, and/or video recorders.

5. The system of claim 1, wherein the AI model is further iteratively trained to generate an objective representation of one or more human characteristics of the law enforcement officer.

6. The system of claim 1, wherein the signal indicating the recommended action for reducing the risk of biased policing includes cues or instructions transmitted in at least one of audio, video, olfactory, haptic, or text format.

7. The system of claim 1, wherein the output device of a law enforcement officer comprises at least one of a headphone, earbud, laptop, smartphone, olfactory device, smart wearable, or at least one of the one or more sensors.

8. The system of claim 1, wherein the behavior of the law enforcement officer indicative of the risk of biased policing is determined based on an action performed by the law enforcement officer and/or a use of language by the law enforcement officer.

9. A method for reducing bias in a policing interaction comprising:
- receiving, by one or more processors, from one or more sensors, input data related to a law enforcement officer and a third party;
- inputting, by the one or more processors, the input data into a collaborative artificial intelligence (AI) model, the AI model being iteratively trained to detect a risk of biased policing at a scene of the policing interaction based on one or more of characteristics, tendencies, or preferences of the law enforcement officer and one or more of historical policing data associated with the law enforcement officer or simulations of policing activities performed by the law enforcement officer;
- receiving, by the one or more processors from the AI model in response to the AI model determining a behavior of the law enforcement officer is indicative of a risk of biased policing based on the input data, a recommended action for reducing the risk of biased policing at the scene of the policing interaction based on the determined behavior of the law enforcement officer that is indicative of the risk of biased policing, the recommended action being personalized for the law enforcement officer; and
- transmitting, by the one or more processors, the recommended action to an output device of the law enforcement officer.

10. The method of claim 9, wherein additional input data is input into the AI model, the additional input data including one or more of law enforcement reports comprising criminal records, psychological reports, mental facilities report, correction facilities reports, or dispatch data.

11. The method of claim 9, wherein the input data includes video data and/or audio data, captured using the one or more sensors.

12. The method of claim 9, wherein the one or more sensors include temperature sensors, proximity sensors, accelerometers, infra-red-light sensors, smoke detectors, gas detectors, alcohol sensors, microphones, audio recorders, and/or video recorders.

13. The method of claim 9, wherein the AI model is further iteratively trained to generate an objective representation of one or more human characteristics of the law enforcement officer.

14. The method of claim 9, wherein the recommended action for reducing the risk of biased policing is provided via a signal including cues or instructions transmitted in at least one of audio, video, olfactory, haptic, or text format.

15. The method of claim 9, wherein the output device of a law enforcement officer comprises at least one of a headphone, earbud, laptop, smartphone, scent device, smart wearable, or at least one of the one or more sensors.

16. The method of claim 9, wherein the behavior of the law enforcement officer indicative of the risk of biased policing is determined based on an action performed by the law enforcement officer and/or a use of language by the law enforcement officer.

17. A non-transitory computer-readable medium storing instructions executable by one or more processors for performing a method of reducing bias in a policing interaction, the method comprising:
- receiving from one or more sensors, input data related to a law enforcement officer and a third party;
- inputting the input data into a collaborative artificial intelligence (AI) model, the AI model being iteratively trained to detect a risk of biased policing at a scene of the policing interaction based on one or more of characteristics, tendencies, or preferences of the law enforcement officer and one or more of historical policing data associated with the law enforcement officer or simulations of policing activities performed by the law enforcement officer;

receiving, from the AI model in response to the AI model determining, a behavior of the law enforcement officer is indicative of a risk of biased policing based on the input data, a recommended action for reducing the risk of biased policing at the scene of the policing interaction based on the determined behavior of the law enforcement officer that is indicative of the risk of biased policing, the recommended action being personalized for the law enforcement officer; and transmitting the recommended action to an output device of the law enforcement officer.

18. The non-transitory computer-readable medium of claim 17, wherein additional input data is input into the AI model, the additional input data including one or more of law enforcement reports comprising criminal records, psychological reports, mental facilities report, correction facilities reports, or dispatch data.

19. The non-transitory computer-readable medium of claim 17, wherein the input data includes video data and/or audio data, captured using the one or more sensors.

20. The non-transitory computer-readable medium of claim 17, wherein the one or more sensors include temperature sensors, proximity sensors, accelerometers, infra-red-light sensors, smoke detectors, gas detectors, alcohol sensors, microphones, audio recorders, and/or video recorders.

* * * * *